United States Patent [19]

Jackson et al.

[11] Patent Number: 5,133,073
[45] Date of Patent: Jul. 21, 1992

[75] Inventors: James H. Jackson; Ming-Chih Lee, both of Cary, N.C.; Mark R. LaForest, Waltham; Richard D. Florentino, Carlisle, both of Mass.

[73] Assignee: Wavetracer, Inc., Acton, Mass.

[21] Appl. No.: 529,962

[22] Filed: May 29, 1990

[51] Int. Cl.$^5$ .................................... G06F 13/00

[52] U.S. Cl. .................... 395/800; 395/325; 364/DIG. 1; 364/229.4; 364/231.9; 364/DIG. 2; 364/931.01; 364/931.02; 364/949.4

[58] Field of Search ................... 371/8.1, 11.1, 371/11.2 11.3; 364/200 MS File, 900 MS File

[56] References Cited

U.S. PATENT DOCUMENTS

| | | | |
|---|---|---|---|
| 3,891,836 | 6/1975 | Lee | 235/151.12 |
| 3,902,160 | 8/1975 | Kawa | 340/146.3 |
| 3,936,885 | 2/1976 | Mutafelija | 444/1 |
| 3,970,993 | 7/1976 | Finnila | 340/172.5 |
| 3,984,819 | 10/1976 | Anderson | 340/172.5 |
| 4,011,545 | 3/1977 | Nadir | 340/172.5 |
| 4,051,551 | 9/1977 | Lawrie et al. | 364/200 |
| 4,064,392 | 12/1977 | Desalu | 364/492 |
| 4,149,248 | 4/1979 | Pavkovich | 364/414 |
| 4,174,514 | 11/1979 | Sternberg | 340/146.3 MA |
| 4,239,312 | 12/1980 | Myer et al. | 339/17 N |
| 4,247,892 | 1/1981 | Lawrence | 364/200 |
| 4,275,410 | 6/1981 | Grinberg et al. | 357/68 |
| 4,293,921 | 10/1981 | Smith, Jr. | 364/726 |
| 4,313,342 | 2/1982 | Poppendiek | 73/154 |
| 4,507,726 | 3/1985 | Grinberg et al. | 364/200 |
| 4,509,195 | 4/1985 | Nadler | 382/51 |
| 4,543,642 | 9/1985 | Hansen | 364/900 |
| 4,598,400 | 7/1986 | Hillis | 370/60 |
| 4,621,339 | 11/1986 | Wagner et al. | 364/900 |
| 4,656,463 | 4/1987 | Anders et al. | 340/572 |
| 4,660,166 | 4/1987 | Hopfield | 364/807 |
| 4,667,308 | 5/1987 | Hayes et al. | 364/900 |
| 4,685,070 | 8/1987 | Flinchbaugh | 364/522 |
| 4,697,247 | 9/1987 | Grinberg et al. | 364/713 |
| 4,709,327 | 11/1987 | Hillis et al. | 364/200 |
| 4,720,780 | 1/1988 | Dolecek | 364/200 |
| 4,729,095 | 3/1988 | Colley et al. | 364/200 |
| 4,739,474 | 4/1988 | Holsztynski | 364/200 |
| 4,739,476 | 4/1988 | Fiduccia | 364/200 |
| 4,747,060 | 5/1988 | Sears, III et al. | 364/481 |
| 4,766,534 | 8/1988 | DeBenedictis | 364/200 |
| 4,791,567 | 12/1988 | Cline et al. | 364/413.13 |
| 4,796,199 | 1/1989 | Hammerstrom et al. | 364/513 |
| 4,805,091 | 2/1989 | Thiel et al. | 364/200 |
| 4,809,346 | 2/1989 | Shu | 382/49 |
| 4,809,347 | 2/1989 | Nash et al. | 382/49 |
| 4,811,210 | 3/1989 | McAulay | 364/200 |
| 4,811,214 | 3/1989 | Nosenchuck et al. | 364/200 |
| 4,814,973 | 3/1989 | Hillis | 364/200 |
| 4,814,980 | 3/1989 | Peterson et al. | 364/200 |
| 4,821,220 | 4/1989 | Duisberg | 364/578 |
| 4,827,132 | 5/1989 | Moscovitch | 250/337 |
| 4,855,903 | 8/1989 | Carleton et al. | 364/200 |
| 4,868,818 | 9/1989 | Madan et al. | 371/11.3 |
| 4,876,641 | 10/1989 | Cowley | 364/200 |
| 4,889,122 | 12/1989 | Watmough et al. | 128/399 |
| 4,891,810 | 1/1990 | de Corlieu et al. | 371/9.1 |
| 5,005,120 | 4/1991 | Ruetz | 364/200 |

OTHER PUBLICATIONS

"The Third Dimension", The 3-D Computer Demonstrates the Feasibility of the Wafer Approach, Byte, Nov. 1988, pp. 311-320.

Primary Examiner—Thomas C. Lee
Assistant Examiner—Richard L. Ellis
Attorney, Agent, or Firm—Weingarten, Schurgin, Gagnebin & Hayes

[57] ABSTRACT

A reconfigurable multi-dimensional processor array for processing multi-dimensionally structured data includes a plurality of processor cells arranged in N dimensions and having a plurality of N−1 dimensional processor subarrays. Each of the processor cells has 2N data signal ports operative for forming data signal paths for transmitting and receiving data to and from 2N adjacent processor cells or data communication devices. Each of the N−1 dimensional processor subarrays includes a selected group of processor cells coupled to fewer than 2N other processor cells or data communications devices. Each of the selected group of processor cells includes at least one uncoupled data signal port. An intermediary connection couples selected uncoupled data signal ports from at least a first N−1 dimensional processor subarray to selected uncoupled data signal ports from at least a second N−1 dimensional processor subarray, to form selected data signal paths between selected processor cells within the at least first and second N−1 dimensional processor subarrays.

11 Claims, 4 Drawing Sheets

PROCESSOR ARRAY OF N-DIMENSIONS WHICH IS PHYSICALLY RECONFIGURABLE INTO N−1 OR FEWER DIMENSIONS

FIELD OF THE INVENTION

This invention relates to parallel processors and more particularly, to a multi-dimensional processor system.

BACKGROUND OF THE INVENTION

Natural phenomena such as electric and magnetic fields, fluid flow, sound waves, and heat flow are, at any given moment in time, represented as spatially distributed data in a three dimensional manner by a number or set of numbers whose indices represent spacial positioning along three mutually orthogonal axes. On occasion, a fourth dimension, namely time, must also be considered. To date, scientists and other computer users wishing to solve partial differential equations that involve spatially distributed data such as Poisson's or Maxwell's equations, have had limited data processing capabilities because prior art processors systems and processor arrays have been limited to one or two-dimensional architectures.

Prior art attempts at solving three-dimensional equations utilizing purely one or two-dimensional arrays have yielded processing systems requiring a large amount of "processor overhead" to calculate an index or address pointer to the second or third dimension of the spatial data which must be stored in memory and not in a processor. For example, in a traditional single processor computer, computing the Z or third dimension index requires up to three multiplications and two addition steps. On a two-dimensional computer, although the X and Y axes are directly accessible, the Z pointer must be calculated which still requires up to one multiplication and one addition.

Prior art attempts at dealing with three-dimensional data also include the utilization of an interconnection arrangement such as that disclosed in U.S. Pat. No. 4,814,973 in which routers may be instructed to switch data between processor cells in a fashion that mimics the behavior of a three-dimensional processor array. Routers, however, require a large amount of processor overhead to move data between the various processor cells. In addition, supporting control circuitry is required to perform the switching function. System throughput or bandwith is significantly compromised by the router overhead, and system cost and reliability are compromised due to the necessity of including the routers and associated control circuitry.

Additionally, dependent upon the data processing being performed, the problem space of a given system of equations may be reduced to fewer dimensions, in which case a large number of processor cells within the multi-dimensional processor array would be unutilized and would not serve to provide additional processors to enlarge the problem solving space in the required dimensions. Further, since developments in technology often preceed software development for a given array dimension, multi-dimensional processor arrays of 3 or more dimensions cannot utilize software developed to operate on processor arrays of fewer than 3 dimensions.

SUMMARY OF THE INVENTION

A reconfigurable multi-dimensional processor array is disclosed for processing data structured in one or more dimensions. In the event that one or more dimensions of the multi-dimensional array are unneeded, the array may be automatically reconfigured as an array having one or more fewer dimensions, to provide a larger number of physical processors in the required dimensions, thereby increasing the size of the problem space without adding additional physical processors.

Such a dimensionally reconfigurable processor array includes a plurality of processor cells arranged in N-dimensions and having a plurality of N−1 dimensional processor subarrays. Each of the processor cells includes 2N data signal ports, operative for transmitting and receiving data to and from 2N dimensionally adjacent processor cells or data communications devices. Each of the N−1 dimensional processor subarrays includes a number of processor cells coupled to 2N dimensionally adjacent processor cells or other data communications devices. Each N−1 dimensional processor subarray also includes a selected group of processor cells coupled to fewer than 2N processor cells or data communication devices, and having at least one uncoupled data signal port operable for transmitting and receiving data to and from at least one additional processor cell or data communication device. An intermediate member connects selected uncoupled data ports from at least a first N−1 dimensional processor subarray, to selected uncoupled data signal ports from a second N−1 dimensional processor subarray, thereby forming selected data signal paths between selected processor cells from at least first and second N−1 dimensional subarrays.

DESCRIPTION OF THE DRAWINGS

These and other features of the present invention will be better understood by reading the following detailed description of the invention, taking together with the drawings, wherein.

DETAILED DESCRIPTION OF THE INVENTION

Figure 1:
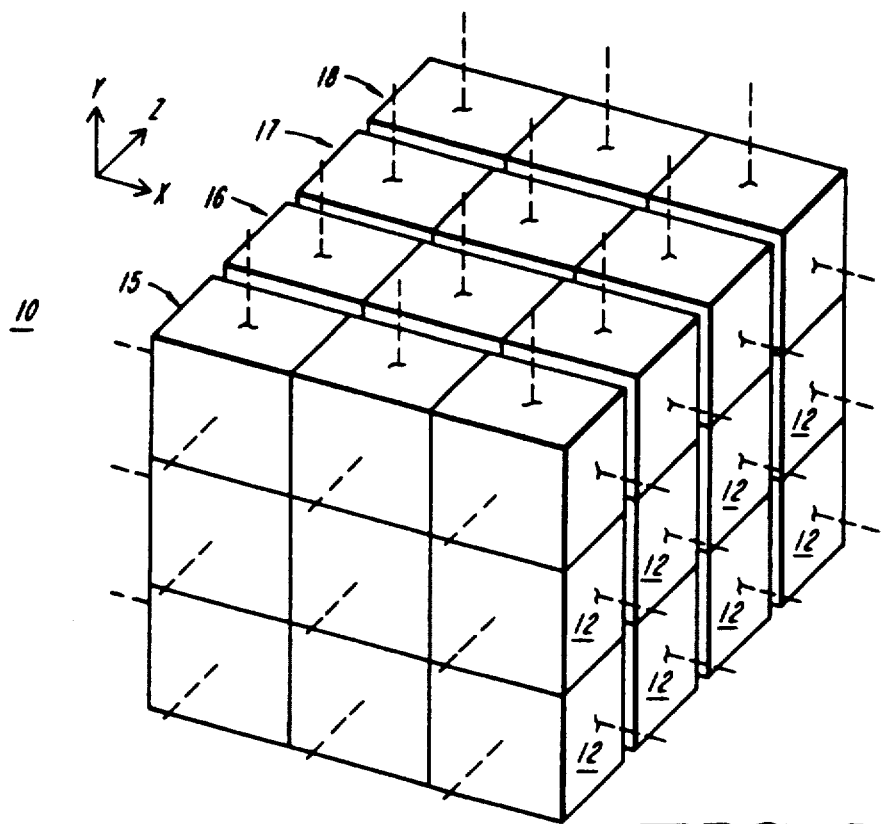
FIG. 1 is an illustration of a three-dimensional 3×3×4 processor array comprised of 36 processor cells.

The reconfigurable multi-dimensional processor array herein disclosed includes a multi-dimensional array, typically of three or more dimensions. Three dimensional processor array 10, FIG. 1, is a 3×3×4 array, comprised of (4) four, two dimensional 3×3 subarrays of processor cells 12, such as two dimensional subarrays 15-18.

Figure 2:
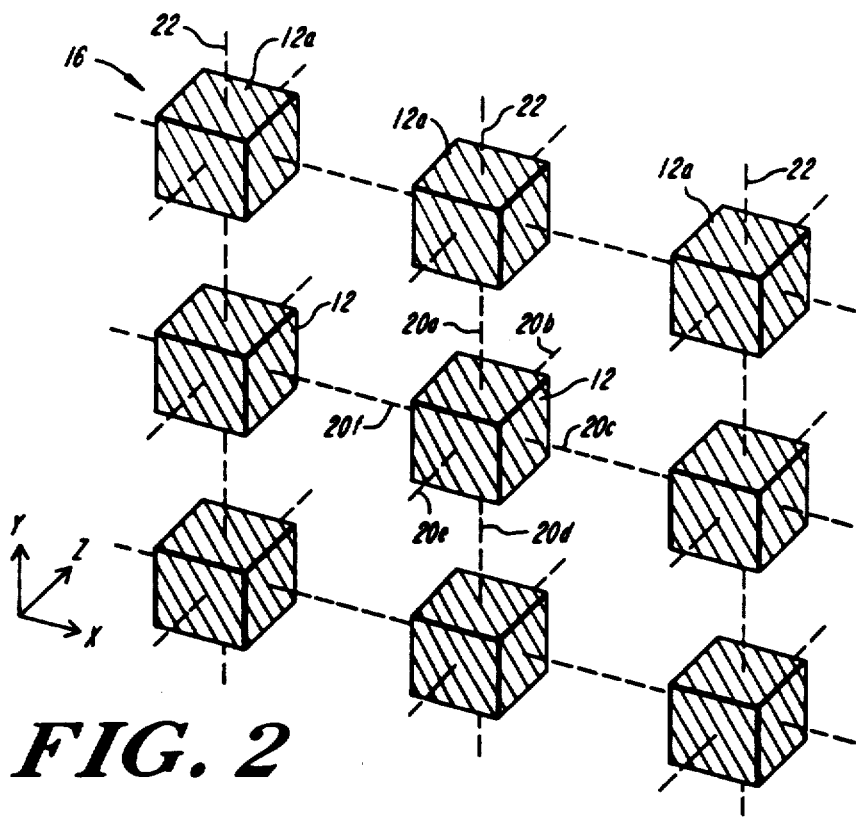
FIG. 2 is a partially exploded view of the three-dimensional processor array of FIG. 1.

Each processor cell of an N dimensional array includes 2N data signal ports operative for forming data signal paths for transmitting and receiving data to and from 2N adjacent other processor cells or data communication devices. In this example, each processor cell 12, FIG. 2, of each subarray such as subarray 16, shown in an exploded view includes six data signal ports 20a-20f which allow each processor cell to send and receive data to and from up to six adjacent processor cells or other data communication devices such as input/output devices.

Although each processor cell is adapted for transferring data to and from up to six adjacent other processor cells of data communication devices, not all processor cells are conceptually positioned adjacent to six processor cells. For example, a number of processor cells such as processor cells 12a are conceptually located on one of the "faces" of the multi-dimensional processor array, and have at least one data signal port 22 which, for a given array configuration, is unused or whose input is ignored. Such unused or unconnected data signal ports form the basis of the reconfigurable multi-dimensional array described in greater detail below.

Figure 3:
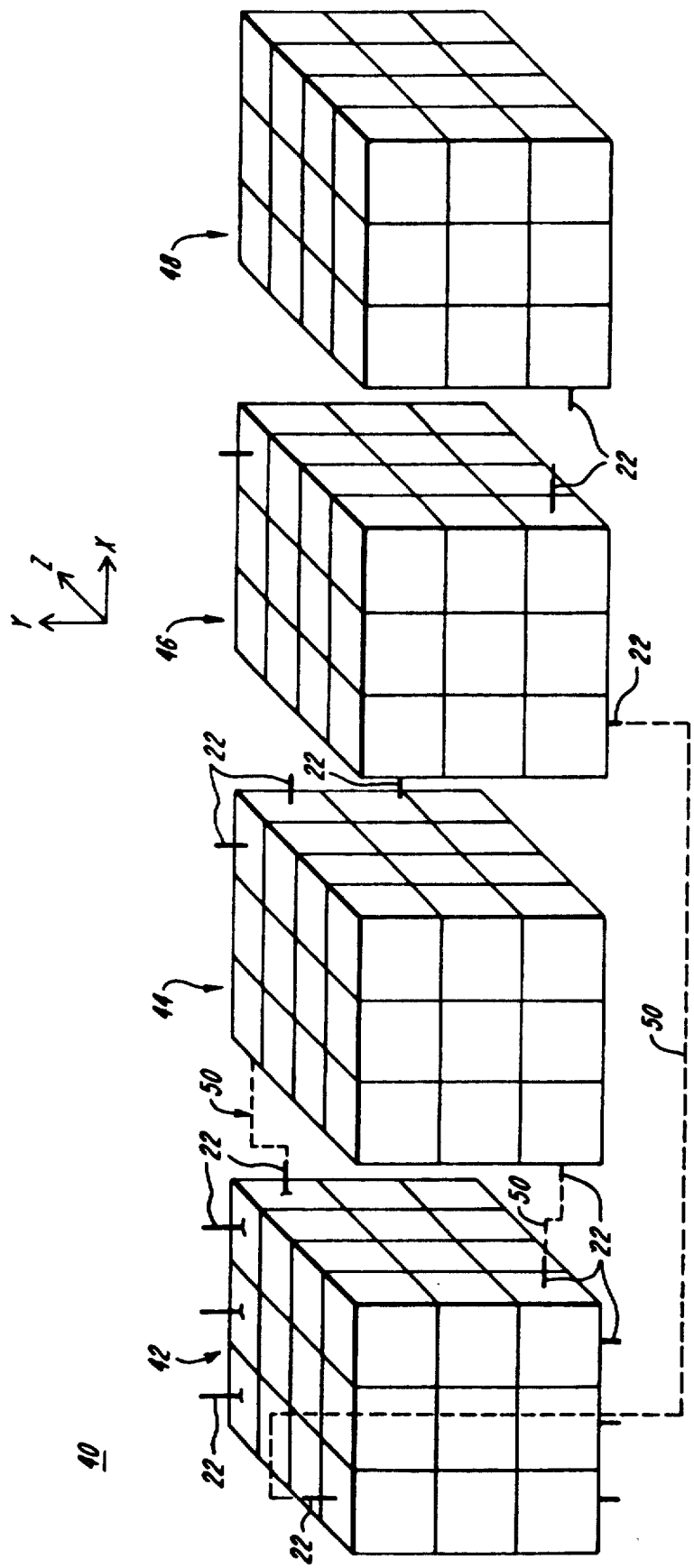
FIG. 3 is a representation of a four dimensional 3×3×4×4 processor array.
Figure 4:
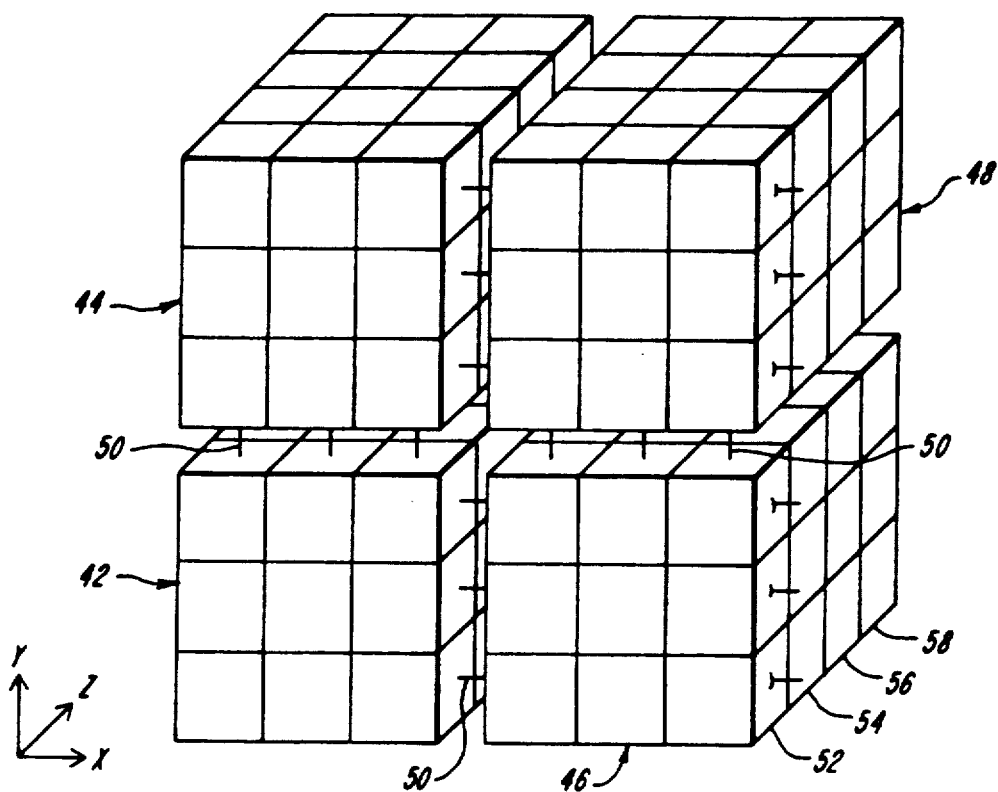
FIG. 4 is an illustration of the four dimensional array of FIG. 3 reconfigured as a three dimensional 6×6×4 array.

The operation of the reconfigurable multi-dimensional array will be more clearly understood referring to FIGS. 3–6 wherein FIG. 3 illustrates a four dimensional 3×3×4×4 array 40 comprised of three dimensional 3×3×4 subarrays 42–48. For the purposes of clarity, interconnections forming four dimensional array 40 are omitted. Detailed functional and connectivity information about such an array may be found in co-pending U.S. patent application Ser. No. 07/530,029 entitled Multi-Dimensional Processor System and Processor Array With Massively Parallel Input/Output assigned to a common assignee, which is incorporated herein by reference. Each subarray 42–48 includes a selected plurality of processor cells each of which has at least one previously unconnected data signal port 22.

Whenever a four dimensional processor array is not necessary in order to solve a particular system of equations, the processor array may be reconfigured to form a larger array of one or more fewer dimensions. For example, by providing intermediary members 50 selectively interconnecting predetermined unconnected signal ports 22, three dimensional subarrays 42–48 may be reconfigured to form a three dimensional 6×6×4 array 60, FIG. 4. Interconnecting member 50 may include a wire link, hardwiring to previously uncoupled signal ports together or alternatively, may be merely a software controlled and activated interconnection.

Although not a limitation of the invention, it may be advantageous for a multi-dimensional processor system to maintain three dimensional array 60 in a configuration which is as close to a perfect "cube" as possible. Accordingly, three-dimensional subarrays 42–48 have been reconfigured in both the X and Y axes by joining subarrays 42 to 44 and 46 to 48 along the X axis, and subarrays 46 to 42 and 48 to 44 along the Y axis. In addition to providing a reasonably symmetrical reconfigured three dimensional array, this reconfiguration arrangement also maintains the previously defined data shifting paths among the individual processor cells in both the X and Y dimensions.

Figure 5:
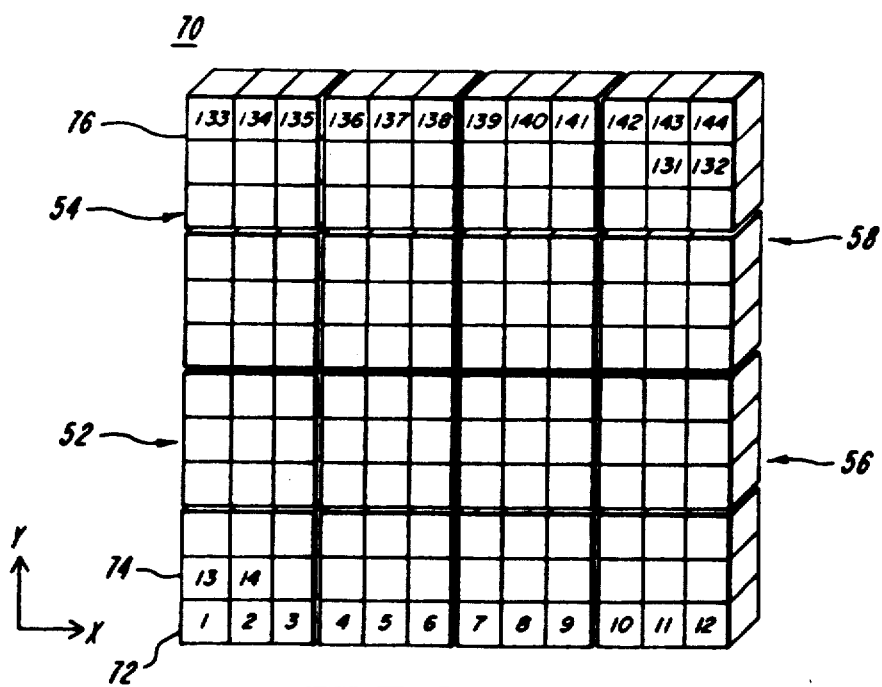
FIG. 5 is an illustration of a two dimensional 12×12 array reconfigured from the three dimensional array of FIG. 4.

Since three dimensional array 60 is now comprised of four, 6×6 two dimensional subarrays 52–58, reconfiguring the two dimensional arrays results in a 12×12 two dimensional array 70, FIG. 5. In order to maintain a generally "square" two dimensional array while preserving the previously defined data shifting paths in both the X and Y dimensions, subarrays 52–58 have their previously unused or unconnected data signal ports selectively connected in the X and Y dimensions forming two dimensional array 70.

Figure 6:
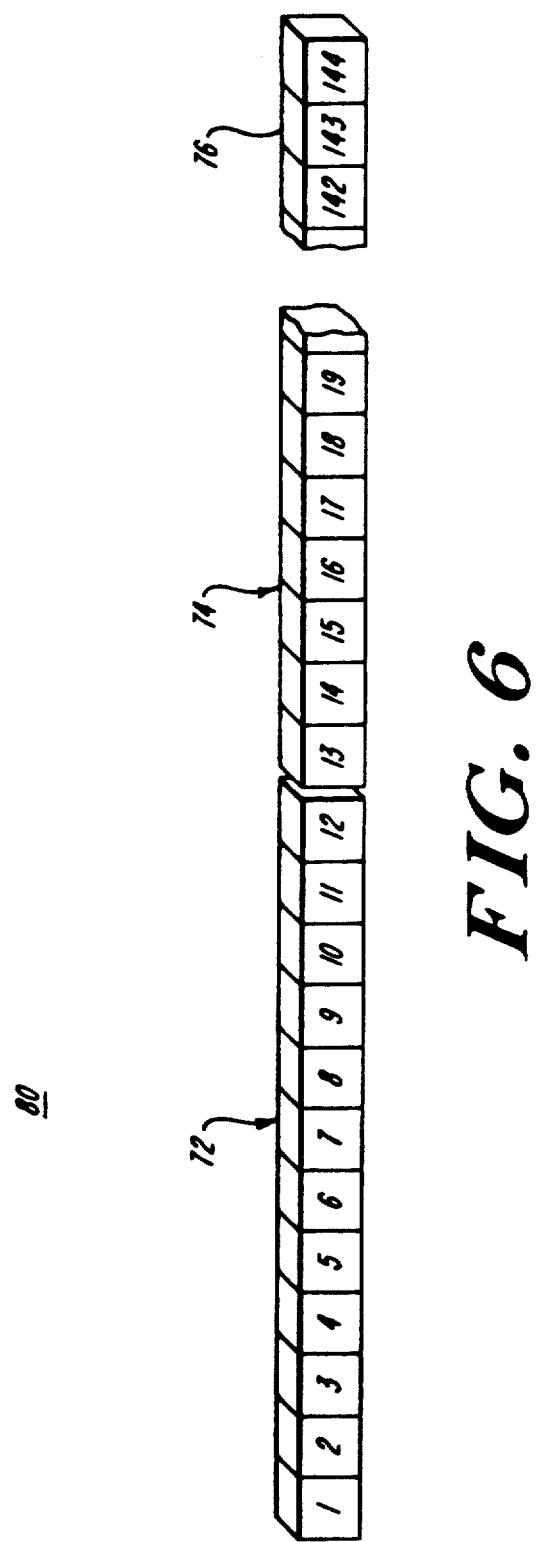
FIG. 6 is an illustration of the reconfiguration of the two dimensional array of FIG. 5 into a single dimension 144 cell array.

Since two dimensional array 70 includes the plurality of one dimensional arrays in either the X or Y dimensions such as 12×1 subarrays 72, 74 and 76 these subarrays may be further reconfigured and joined in the X dimension forming 144×1 array 80, FIG. 6. The two dimensional array 70 of FIG. 5 could also have been reconfigured in a similar manner in the Y dimension. Further, it is to be understood that by providing the necessary hardwired and/or software interconnections, an array of N-dimensions may be reconfigured as an array of N−1, N−2, down to a one dimensional array directly, and is not limited to reconfiguring to an array of only one lesser dimension.

Modifications and substitutions of the present invention by one of ordinary skill in the art are considered to be within the scope of the present invention and the claims which follow.

What is claimed is:

1. A reconfigurable, multi-dimensional processor array, for processing multi-dimensionally structured data comprising:
   a plurality of processor cells arranged in N dimensions, N being at least 2, and having a plurality of N−1 dimensional processor subarrays;
   each of said plurality of processor cells including 2N data signal ports operative for forming 2N data signal paths, for transmitting and receiving data to and from up to 2N data communications devices;
   each of said plurality of N−1 dimensional processor subarrays including a selected group of processor cells having at least one unused data signal port; and
   a plurality of intermediary connections, forming data signal paths between unused data signal ports of a first selected group of processor cells from at least a first N−1 dimensional processor subarray, and unused data signal ports of a second selected group of processor cells from at least a second N−1 dimensional processor subarray, for providing a reconfigured processor array of fewer than N-dimensions.

2. The processor array of claim 1 wherein said data communication devices include processor cells.

3. The processor array of claim 1 wherein said data communication devices include input/output devices for transmitting and receiving data to and from the processor array.

4. The processor array of claim 1 wherein said first and second selected group of processor cells are coupled to fewer than 2N data communications devices.

5. The processor array of claim 1 wherein said multi-dimensional array is arranged in three dimensions.

6. The processor array of claim 5 wherein said subarrays are two-dimensional.

7. The processor array of claim 1 wherein data is transmitted and received among each of said plurality of processor cells in at least one predetermined direction.

8. The processor array of claim 7 wherein processor cells of said reconfigured processor array transmit and receive data in said at least one predetermined direction.

9. The processor array of claim 1 wherein said plurality of intermediary connections include selectively controllable and selectively activated intermediary connections.

10. A reconfigurable, multi-dimensional processor array, for processing multi-dimensionally structured data comprising:

a plurality of processor cells arranged in N-dimensions, being at least 2,;

each of said plurality of processor cells including 2N data signal ports operative for forming 2N data signal paths, for transmitting and receiving data to and from up to 2N data communications devices;

said plurality of processor cells including a selected group of processor cells having at least one data signal port which is unused for data communications; and a plurality of intermediary connections, forming data signal paths between unused data signal ports of predetermined processor cells from said selected group of processor cells, for providing a processor array of fewer than N-dimensions.

11. A three dimensional processor array reconfigurable as a two-dimensional processor array for processing multi-dimensionally structured data comprising:

a plurality of processor cells arranged in three dimensions and having a plurality of two-dimensional subarrays;

each of said plurality of processor cells having six data signal ports operative for forming six data signal paths for transmitting and receiving data to and from up to six dimensionally adjacent processor cells;

each of said plurality of two-dimensional subarrays including a selected group of processor cells having at least one unused data signal port; and a plurality of intermediary connections coupling unused data signal ports of a plurality of said selected group of processor cells from at least a first two-dimensional processor subarray, with a plurality of said selected group of processor cells from at least a second two-dimensional processor subarray, for forming data signal paths between said at least first and second two-dimensional processor subarrays, for reconfiguring said three dimensional processor array to a two-dimensional processor array.

* * * * *

UNITED STATES PATENT AND TRADEMARK OFFICE
CERTIFICATE OF CORRECTION

PATENT NO.  : 5,133,073
DATED       : July 21, 1992
INVENTOR(S) : James H. Jackson, et al.

It is certified that error appears in the above-identified patent and that said Letters Patent is hereby corrected as shown below:

On the title page, item: (56), insert the title --PROCESSOR ARRAY OF N-DIMENSIONS WHICH IS PHYSICALLY RECONFIGURABLE INTO N-1 OR FEWER DIMENSIONS--.

Column 3, line 27, "07/530,029" should read --07/530,027--.

Signed and Sealed this

Nineteenth Day of October, 1993

Attest:

BRUCE LEHMAN

*Attesting Officer*    Commissioner of Patents and Trademarks